United States Patent
Yuh et al.

(10) Patent No.: US 11,949,130 B2
(45) Date of Patent: Apr. 2, 2024

(54) FUEL CELL INACTIVE END CELL DESIGN TO IMPROVE ELECTRIC AND MECHANICAL CONTACT

(71) Applicant: FUELCELL ENERGY, INC., Danbury, CT (US)

(72) Inventors: Chao-Yi Yuh, New Milford, CT (US); Lawrence Novacco, Brookfield, CT (US); Ling Chen, Woodbury, CT (US); Ramakrishnan Venkataraman, Danbury, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 85 days.

(21) Appl. No.: 16/963,137

(22) PCT Filed: Jan. 18, 2019

(86) PCT No.: PCT/IB2019/050447
§ 371 (c)(1),
(2) Date: Jul. 17, 2020

(87) PCT Pub. No.: WO2019/145836
PCT Pub. Date: Aug. 1, 2019

(65) Prior Publication Data
US 2021/0126265 A1  Apr. 29, 2021

Related U.S. Application Data (60) Provisional application No. 62/620,835, filed on Jan. 23, 2018.

(51) Int. Cl.
*H01M 8/0245* (2016.01)
*H01M 8/0206* (2016.01)
(Continued)

(52) U.S. Cl.
CPC ....... *H01M 8/0245* (2013.01); *H01M 8/0206* (2013.01); *H01M 8/0232* (2013.01);
(Continued)

(58) Field of Classification Search
CPC ............. H01M 8/0245; H01M 8/0206; H01M 8/0232; H01M 8/244; H01M 8/2475; H01M 2008/147; Y02E 60/50
See application file for complete search history.

(56) References Cited

U.S. PATENT DOCUMENTS

| | | |
|---|---|---|
| 5,811,202 A | 9/1998 | Petraglia |
| 7,201,985 B2 | 4/2007 | Yuh et al. |

(Continued)

FOREIGN PATENT DOCUMENTS

| | | |
|---|---|---|
| CN | 1720634 A | 1/2006 |
| CN | 101677129 A | 3/2010 |

OTHER PUBLICATIONS

International Search Report and Written Opinion in PCT/IB2019/050447 dated Apr. 3, 2019 (10 pages).

*Primary Examiner* — Ula C Ruddock
*Assistant Examiner* — Sarika Gupta
(74) *Attorney, Agent, or Firm* — Foley & Lardner LLP (57) ABSTRACT

An end cell assembly for a fuel cell stack includes an end plate and at least two inactive anode parts disposed adjacent to the end plate. Each inactive anode part comprises a nickel foam anode disposed directly above an anode current collector and a separator sheet disposed 5 above the nickel foam anode.

14 Claims, 8 Drawing Sheets

(51) Int. Cl.
*H01M 8/0232* (2016.01)
*H01M 8/14* (2006.01)
*H01M 8/244* (2016.01)
*H01M 8/2475* (2016.01)

(52) U.S. Cl.
CPC ......... *H01M 8/244* (2013.01); *H01M 8/2475* (2013.01); *H01M 2008/147* (2013.01)

(56) References Cited

U.S. PATENT DOCUMENTS

| | | | | |
|---|---|---|---|---|
| 2004/0121200 | A1* | 6/2004 | Johnsen | H01M 8/0247 429/529 |
| 2007/0243451 | A1* | 10/2007 | Yuh | H01M 4/8657 429/518 |
| 2008/0280183 | A1* | 11/2008 | Eun | H01M 8/0247 429/454 |
| 2010/0068599 | A1* | 3/2010 | Furusawa | H01M 8/04156 429/439 |

* cited by examiner

FUEL CELL INACTIVE END CELL DESIGN TO IMPROVE ELECTRIC AND MECHANICAL CONTACT

CROSS-REFERENCE TO RELATED APPLICATION

The present application is a U.S. national phase application under 35 U.S.C. § 371 of International Application No. PCT/IB2019/050447, filed on Jan. 18, 2019, which claims the benefit of and priority to U.S. Provisional Patent Application No. 62/620,835, filed Jan. 23, 2018, the entire disclosures of which are incorporated herein by reference.

BACKGROUND

The present application relates generally to the field of high-temperature fuel cells. Specifically, the present application relates to inactive end-cell assemblies for use at positive and negative ends of a high-temperature fuel cell stack. High-temperature fuel cells may include Molten Carbonate Fuel Cells ("MCFC"), Solid Oxide Fuel Cells ("SOFC"), or other types of fuel cells that operate at high temperatures.

SUMMARY

One embodiment relates to an end cell assembly for a fuel cell stack, including an end plate and at least two inactive anode parts disposed adjacent to the end plate. Each inactive anode part comprises a nickel foam anode disposed directly above an anode current collector and a separator sheet disposed above the nickel foam anode.

In one aspect of the end cell assembly, each inactive anode part further comprises a nickel coating disposed on the anode current collector.

In another aspect of the end cell assembly, each inactive anode part further includes a bipolar plate and the anode current collector contacts the bipolar plate through the nickel coating.

In another aspect of the end cell assembly, the nickel coating is bonded to the anode current collector.

In another aspect of the end cell assembly, each inactive anode part further comprises a bipolar plate and a nickel foil layer disposed between the anode current collector and the bipolar plate.

In another aspect of the end cell assembly, the nickel foil layer is bonded to the bipolar plate.

In another aspect of the end cell assembly, each inactive anode part further includes a bipolar plate and a nickel foam layer disposed between the anode current collector and the bipolar plate.

In another aspect of the end cell assembly, the nickel foam layer is configured to deform around the anode current collector as the anode current collector and the bipolar plate are compressed toward each other.

In another aspect of the end cell assembly, each inactive anode part further includes a bipolar plate and a copper plate disposed between the anode current collector and the bipolar plate.

In another aspect of the end cell assembly, each inactive anode part further includes a bipolar plate and a copper layer disposed on the bipolar plate, and the anode current collector is disposed on the bipolar plate on an opposing side from the copper layer.

In another aspect of the end cell assembly, the separator sheet is a first separator sheet, each inactive anode further includes a second separator sheet disposed on the copper layer, and the copper layer is disposed between the bipolar plate and the second separator sheet.

In another aspect of the end cell assembly, the end cell assembly further includes a cathode reservoir disposed adjacent to the at least two inactive anode parts, a third inactive anode part disposed on an opposing side of the cathode reservoir, and an active cathode part disposed on an opposing side of the third inactive anode part from the cathode reservoir. The end plate is a positive end plate.

In another aspect of the end cell assembly, the cathode reservoir includes a first cathode current collector, a second cathode current collector adjacent to the first cathode current collector, a first cathode, and a second cathode disposed between the first cathode and the second cathode current collector.

In another aspect of the end cell assembly, the end cell assembly further includes a cathode reservoir disposed adjacent to the at least two inactive anode parts, and an active anode part disposed on an opposing side of the cathode reservoir from the at least two inactive anode parts. The end plate is a negative end plate.

In another aspect of the end cell assembly, the cathode reservoir includes a first cathode current collector, a second cathode current collector adjacent to the first cathode current collector, a first cathode, and a second cathode disposed between the first cathode and the second cathode current collector.

Another embodiment relates to an inactive anode half-cell in an end cell of a fuel cell stack, including a first flat cathode and a reservoir disposed on the first flat cathode. The reservoir includes a cathode current collector disposed on a second flat cathode. The second flat cathode is disposed between the first flat cathode and the cathode current collector.

Another embodiment relates to an inactive anode half-cell in an end cell of a fuel cell stack, including a copper layer disposed proximate an anode current collector.

Another embodiment relates to an inactive anode half-cell in an end cell of a fuel cell stack, including an anode current collector, a bipolar plate, and a nickel layer disposed therebetween.

In one aspect of the inactive anode half-cell, the nickel layer is a nickel coating on the anode current collector.

In another aspect of the inactive anode half-cell, the nickel layer is a nickel foam panel.

In another aspect of the inactive anode half-cell, the nickel layer is a nickel-based foam compressed between the anode current collector and the bipolar plate.

DETAILED DESCRIPTION

Figure 1:
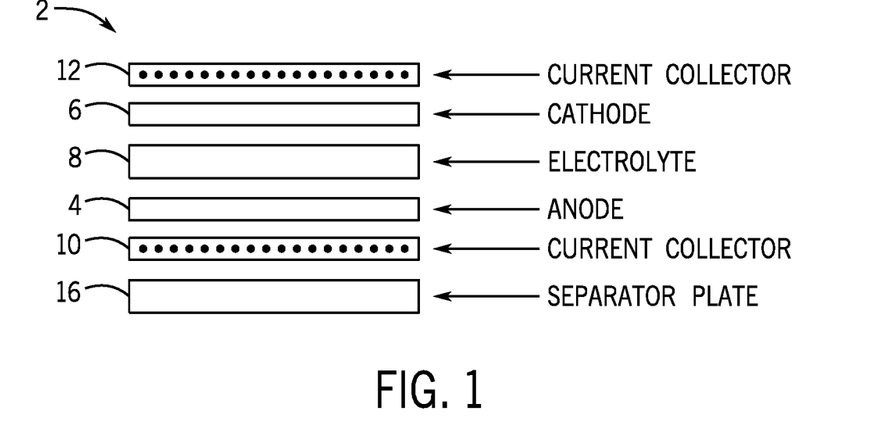
FIG. 1 is a schematic representation of the components of a conventional fuel cell assembly.

Referring to FIG. 1, a schematic view of a conventional fuel cell 2 is shown as including an anode 4, a cathode 6 and an electrolyte 8 disposed therebetween. An anode current collector 10 is disposed proximate the anode 4, such that the anode 4 is disposed between the electrolyte 8 and the anode current collector 10 (e.g., the anode current collector 10 and the electrolyte 8 are disposed on opposing sides of the anode 4). The anode current collector 10 is configured to allow fuel to pass therethrough. Similarly to the anode current collector 10, a cathode current collector 12 is disposed proximate the cathode 6, such that the cathode 6 is disposed between the electrolyte 8 and the cathode current collector 12 (e.g., the cathode current collector 12 and the electrolyte 8 are disposed on opposing sides of the cathode 6). The cathode current collector 12 is configured to allow oxygen or other gas to flow therethrough.

In a MCFC, a carbonate electrolyte may include an alkali metal carbonate material, such as lithium or potassium carbonate, in a particulate matrix of inert ceramic material, such as lithium aluminate. At the operating temperature of the MCFC, which may be, for example, approximately 650° C. (1200° F.), the carbonate electrolyte is an ionically conductive molten liquid.

With fuel introduced at an anode electrode and oxidant introduced at a cathode electrode, the fuel is oxidized in an electrochemical reaction at the interface between the electrodes and the electrolyte 8. This reaction releases a flow of electrons between the anode 4 and cathode 6, thereby converting chemical energy into electrical energy. The anode and cathode electrodes may be formed from a porous metal (e.g., porous nickel powder or nickel oxide) that is sufficiently active at cell operating temperatures, such that the anode and cathode electrodes are catalysts for the reactions in the anode 4 and the cathode 6, respectively.

Figure 3:
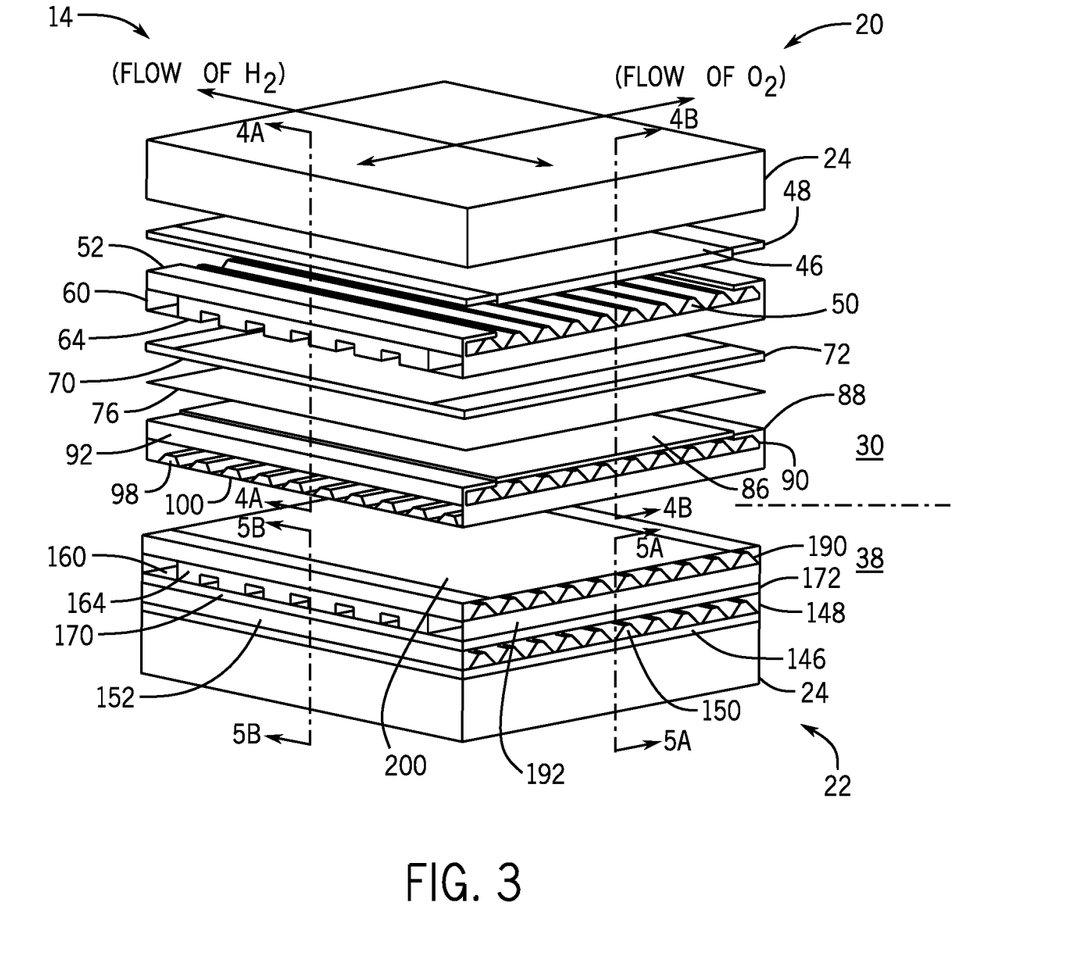
FIG. 3 is an exploded perspective view of the end cell assemblies at both the positive and negative ends of a fuel cell stack, according to an exemplary embodiment.

A single fuel cell 2 as shown in FIG. 1 may produce relatively low voltage. To generate higher voltages, individual fuel cells 2 may be arranged in series as a fuel cell stack (e.g., as shown in FIG. 3 as a fuel cell stack 14). Referring to FIG. 1, a separator plate 16 is provided to separate each fuel cell 2 from adjacent fuel cells 2 in the stack. According to an exemplary embodiment, the separator plate 16 may be formed from stainless steel or another suitable material.

As used herein, the term "end cell" is defined as either of the fuel cells at a positive (i.e., cathode) end or a negative (i.e., anode) end of the stack, each of which provides structural termination to the stack. For example, as shown in FIG. 3, the fuel cell stack 14 includes a positive end 20 and a negative end 22, and the fuel cell at either end would be referred to as an "end cell."

In conventional fuel cells, an amount of electrolyte may be lost (i.e., reduced), at least in part, from the cells proximate the positive end of the fuel cell stack and may be gained (i.e., increased, decreased, etc.) in the cells proximate the negative end of the stack. Generally, at least two processes cause a greater loss of the electrolyte at or near the positive end than lost from fuel cells generally disposed between the positive end and the negative end of the stack. One process is liquid electrolyte creepage onto a structurally terminating end plate, which is adjacent to the end cell. For example, an end plate may be disposed on and coupled to the end cell at each end of the stack. Another process includes migration of the electrolyte, during which the electrolyte flows in films along the surfaces of the stack toward the negative end. As a result of either process, fuel cells proximate the positive end of the stack may lose an amount of the electrolyte to middle cells (e.g., fuel cells disposed between the positive and negative ends) and fuel cells proximate the negative end may gain an amount of electrolyte. The effects of electrolyte migration may be the most severe in the end cells, which are positioned closest to the positive and negative ends of the stack. Depletion of electrolyte from the positive end by creepage and/or migration may result in gas pockets being formed in the electrolyte matrix. The formation of gas pockets then results in a substantially irreversible increase in internal electrical resistance of the end cells, significant voltage drop, and/or deterioration of long-term end cell performance. Furthermore, electrolyte migration towards the negative end may cause flooding of the negative end cell and loss of performance and/or long-term stability.

Another issue associated with end cells in a fuel cell stack is the increase in electrical resistance in the end cell due to shrinkage or deformity of various components of the fuel cell at operating temperatures of the stack. For example, MCFC stack designs may include rigid, thick end plates to which an appropriate compressive loading force is directly applied for adequate sealing and good electrical and thermal conductivity between adjacent fuel cells and other components within the stack. At normal operating temperatures, and particularly during startup and shutdown of a fuel cell stack, temperature gradients may form between the opposite surfaces of the end plates, causing the end plates to deform. Additional mechanical mismatch may occur during operation of the stack, for example at the end cell at the positive end, due to cathode shrinkage. This shrinkage may occur slowly over time with operation of the stack, or may happen suddenly.

A cathode "half-cell" may be formed from a corrugated current collector with a cathode attached thereto. The current collector extends over the cross-sectional area of the fuel cell. However, the cathode may extend over less than the entire area, since it does not extend to the edges, which are configured to form a wet seal. A thickness (e.g., height) of the cathode may be matched to (e.g., correspond to) a thickness of the wet seal, such that the fuel cell may be maintained in a flat configuration across the entire surface area. In this configuration, a substantially flat shim (e.g., formed from sheet metal or other suitable material) may be inserted under a flap of the wet seal to account for a difference in thickness of the active area (e.g., where the cathode is positioned) and the wet seal. As the cathode shrinks, the compressive force on the cell may shift from the active part of the cell to the wet seal area, effectively reducing the total compressive force on the cathode. This reduction of compressive force in the active area may thereby cause a loss (i.e., reduction) of electrical contact at various locations within the end cell and result in non-uniform application of the compressive force across the fuel cell. Once electrical contact loss occurs, recovery of the original electrical conductivity at the interface is unlikely, even if the original distribution of compressive forces is corrected or returns.

Figure 2A:
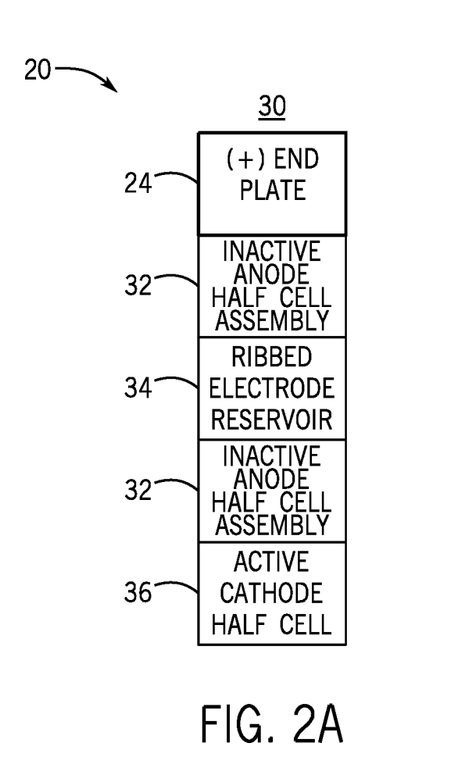
FIG. 2A is a block diagram of an end cell assembly at a positive end of a molten carbonate fuel cell stack, according to an exemplary embodiment.

Referring now to FIG. 2A, a positive end cell assembly 30 (e.g., an end cell at a positive end 20 of the fuel cell stack 14) is shown according to an exemplary embodiment. An inactive anode part 32 (e.g., half-cell) is disposed adjacent to an end plate 24 at the positive end 20 of the stack 14. A ribbed electrode reservoir 34 (e.g., sink) is disposed adjacent to the inactive anode part 32 and a second inactive anode part 32 is disposed on an opposing side of the reservoir 34. An active cathode part 36 is disposed on an opposing side of the second inactive anode part 32 from the reservoir 34, such that the second inactive anode part 32 is disposed between the reservoir 34 and the active cathode part 36.

Figure 2B:
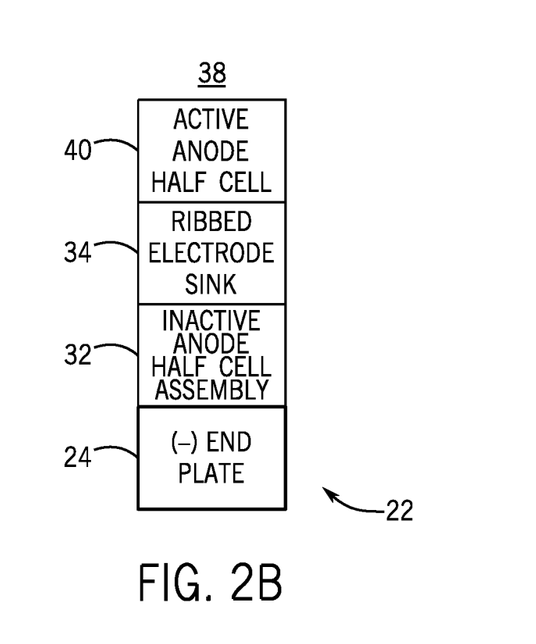
FIG. 2B is a block diagram of an end cell assembly at a negative end of a molten carbonate fuel cell stack, according to an exemplary embodiment.

Referring now to FIG. 2B, a negative end cell assembly 38 (e.g., an end cell at a negative end 22 of a fuel cell stack 14) is shown according to an exemplary embodiment. An inactive anode part 32 is disposed adjacent to an end plate 24 at the negative end 22 of the stack 14. A ribbed electrode reservoir 34 (e.g., sink) is disposed adjacent to the inactive anode part 32 on an opposing side of the inactive anode part 32. An active anode part 40 is disposed on an opposing side of the reservoir 34 from the inactive anode part 32, such that the reservoir 34 is disposed between the inactive anode part 32 and the active anode part 40.

Referring now to FIG. 3, an exploded perspective view of a MCFC stack 14, including the structure of each layer of the end cell on both ends, is shown according to an exemplary embodiment. First, the structure of the positive end cell assembly 30 in the fuel cell stack 14 will be described with reference to the upper portion of FIG. 3 and FIGS. 4A and 4B. Referring to the FIGURES generally, broken lines having uneven dashes (i.e., dash-dot) at an edge of an end plate may define a broken edge, such that an end plate or other structure may continue past the broken line. For example, the end plate may be substantially symmetrical about the broken line, in which case the broken line may form an axis of symmetry. According to an exemplary embodiment, opposing sides of the end plate may have a substantially same structure, symmetrical about the broken line. The structure of the end plate proximate the broken line may continue (e.g., define a pattern) extending between the opposing sides.

Figure 4A:
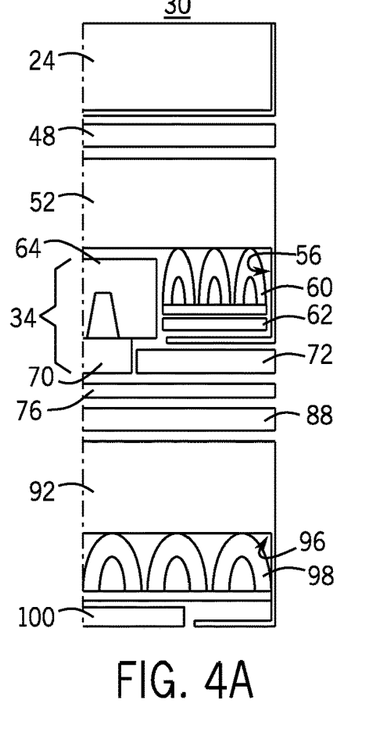
FIG. 4A is a cross-sectional view of an end cell assembly at the positive end of a fuel cell stack taken along line 4A-4A of FIG. 3.
Figure 4B:
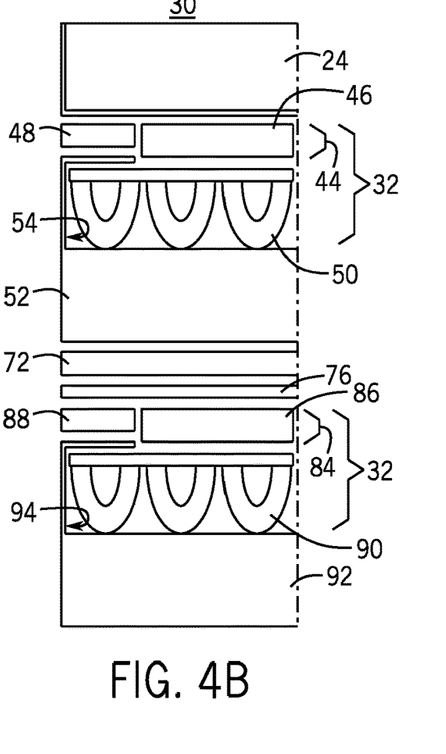
FIG. 4B is a cross-sectional view of the end cell assembly of FIG. 4A, taken along line 4B-4B of FIG. 3, substantially perpendicular to FIG. 4A.

As shown in FIGS. 3, 4A, and 4B, the fuel cell stack 14 terminates at both ends with a thick, rigid end plate 24 (e.g., formed from stainless steel). The inactive anode part 32 in positive end cell assembly 30 that separates the positive end plate 24 from ribbed electrode reservoir 34 includes a foam anode layer 44 (e.g., shown in FIG. 4B) and an anode current collector 50 ("ACC").

In the inactive anode part 32, the foam anode layer 44 is disposed adjacent to the end plate 24 on the positive end 20 of the stack 14. The foam anode layer 44 may include a nickel foam inactive anode 46 disposed between two matrix strips 48 (e.g., gaskets). The nickel foam anode 46 serves as an electrically conductive separating interface between the end plate 24 and the ribbed electrode reservoir 34. Matrix strips 48 may be formed from porous ceramics or other suitable materials and are disposed along either side of the nickel foam anode 46 relative to the flow of a reducing gas (e.g., hydrogen) and the liquid electrolyte 8 may fill the strips 48. By filling the strips 48 with the electrolyte 8, and blocking the fuel gas from flowing elsewhere, the matrix strips 48 help maintain a gas seal between the hydrogen and oxygen gases flowing through the stack 14 at the same time.

Disposed (e.g., directly) beneath the foam anode layer 44 in the inactive anode part 32 is an ACC 50. According to an exemplary embodiment, the ACC 50 may be formed from austenitic stainless steel or other suitable material. The ACC 50 is contained within a top pocket of a bipolar plate 52. According to an exemplary embodiment, the bipolar plate 52 may define a three-dimensional "S"-shaped configuration, although other configurations (e.g., corrugated, etc.) may be used. The bipolar plate 52, defines top and bottom pockets 54, 56 (shown in FIGS. 4A and 4B) disposed along the flow of reducing gas and along the flow of oxidizing gas, respectively. According to an exemplary embodiment, the bipolar plate 52 may be formed from nickel-coated austenitic stainless steel, although other suitable materials may be used. The top and bottom pockets 54, 56 of the "S"-shaped bipolar plate 52 each form a lip folding over a portion of the top and bottom pockets 54, 56, along both edges thereof. A top lip of the bipolar plate 52 folds over the ACC 50 along its edges parallel to the direction of the flow of reducing gas and matches up with edges of the nickel foam anode 46 such that the foam anode 46 is disposed directly above the ACC 50, between the top edges of the bipolar plate 52, as shown. In this configuration, the ACC 50 may be in direct contact with, and collect current from, the nickel foam inactive anode 46. Both matrix strips 48 in the foam anode layer 44 are sandwiched between the top lip of the bipolar plate 52 and the end plate 24 at the positive end 20.

A center portion of the bipolar plate 52 separates the ACC 50 from the structure contained within the bottom pocket 56 of the bipolar plate. The foam anode layer 44 and the ACC 50 together make up the inactive anode part 32, which separates the end plate 24 from the reservoir 34, as described in further detail below.

The lower lip of the bipolar plate 52 folds under the bottom pocket 56 along its edge, parallel to the direction of the flow of oxidizing gas. However, unlike the top pocket 54 formed by the bipolar plate 52, in which the ACC 50 is completely disposed, the bottom pocket 56 of the bipolar plate 52 contains both a soft, compliant cathode current collector ("CCC") 60 and a ribbed cathode 64. According to an exemplary embodiment, the CCC 60 may be formed from austenitic stainless steel, superalloy, or other suitable material, and is disposed between the lower lip and a center portion of the bipolar plate 52 along the length of the lower lip, substantially parallel to the flow of oxidizing gas. The CCC 60 is compliant, resilient, and configured to return to its original shape (i.e., form) after accommodating mechanical changes in the end cell at operating temperatures of the fuel cell stack 14. In order to maintain contact between the CCC 60 and the bipolar plate 52, a metal shim 62 may be disposed between the CCC 60 and the lower lip along the length of the lower lip. The CCC 60 may have a lower yield stress and lower spring constant (e.g., approximately 50% less) relative to the active area of the end cell. A CCC 60 that is both compliant and resilient may reduce or eliminate contact loss in the end cell by yielding to compressive forces and accommodating mechanical changes in the end cell (e.g., in the cathode 64) due to deep thermal cycling during operation of the fuel cell stack 14, and by conforming to a required shape after having been compressed.

The combined effect of the soft, compliant CCC 60 in the bottom pocket 56 of the bipolar plate 52 and the electrically conductive separating interface provided by the inactive anode part 32, described above, is to avoid contact loss and the corresponding substantially irreversible increase in electrical resistance within the end cell, particularly with respect to the positive end 20 of the fuel cell stack 14, wherein mechanical mismatch may be greatest.

A ribbed (e.g., corrugated) cathode 64 may also be disposed in the bottom pocket 56 of the bipolar plate 52. According to an exemplary embodiment, the ribbed cathode 64 may be formed from nickel and, as shown in FIG. 3, defines structural peaks and valleys. The ribbed structure of the cathode 64 provides channels for oxidizing gas to flow through and uniformly oxidize the nickel material from which the ribbed cathode 64 is primarily formed. The lower lip of the bipolar plate 52, which folds under strips of the CCC 60 substantially parallel to the direction of the flow of oxidizing gas, matches up with the edges of ribbed cathode 64, such that the ribbed cathode 64 is disposed between the strips of the CCC 60 and the lower lip portions of the bipolar plate 52, and directly above a flat cathode layer 68. The peaks of the ribbed cathode 64 may be in direct contact with a flat cathode 70. According to an exemplary embodiment, the flat cathode 70 may be formed substantially from nickel.

Matrix strips 72 are disposed on opposing sides of the flat cathode 70, below the lower lip portions of the bipolar plate 52, and may have a structure similar to that of the matrix strips 48 in the foam anode layer 44, described above. As in the foam anode layer 44, the matrix strips 72 fill with liquid electrolyte 8. In the flat cathode layer 70 presently described, however, the matrix strips 72 may be disposed substantially parallel to the direction of oxidizing gas flow.

The combination of the ribbed cathode 64 and flat cathode 70 functions as an electrode reservoir 34 at the positive end 22 of the fuel cell stack 14. As discussed above, molten electrolyte 8 material tends to migrate toward the negative end 22 of the stack during operation. According to an exemplary embodiment, the ribbed cathode 64 may be formed from a substantially nickel material having approximately 65% porosity. According to another exemplary embodiment, the flat cathode 70 may be formed from a substantially nickel of up to 70% porosity. The ribbed and flat cathode 64, 70 structure in the end cell may hold in reserve a significant amount of electrolyte 8 material, thereby mitigating electrolyte 8 migration and loss from the positive end 20 of the stack 14.

As shown in FIG. 4B, a second inactive anode part 32 disposed beneath the ribbed electrode reservoir 34 separates the electrode reservoir 34 from the active cathode part 36. The second inactive anode part 32 in the positive end cell assembly 30 may have substantially the same structure as the other (i.e., first) inactive anode part 32. For example, the second inactive anode part 32 may include a foam anode layer 84, substantially similar to the foam anode layer 44, and having a foam anode 86 sandwiched between opposing matrix strips 88 (i.e., gaskets), and an ACC 90 in a top pocket 94 of a second three-dimensional "S"-shaped bipolar plate 92.

In order to isolate the gas flows of, for example, oxygen through the electrode reservoir 34, and hydrogen through the second inactive anode part 32, a sheet 76 (e.g., formed from 310 stainless steel) is disposed between the electrode reservoir 34 and the second inactive anode part 32 to at least partially fluidly separate the reservoir 34 and the second inactive anode part 32. According to an exemplary embodiment, the steel sheet 76 may be aluminized at its edges for corrosion protection.

Below the second inactive anode part 32, in a bottom pocket 96 of the second "S"-shaped bipolar plate 92, is disposed a CCC 98. According to an exemplary embodiment, the CCC 98 may be formed from an austenitic stainless steel material and have a substantially similar structure as the ACCs 50, 90 in the top pockets 54, 94 of bipolar plates 52, 92, respectively. According to an exemplary embodiment, the CCC 98 may occupy the entire bottom pocket 96 of the bipolar plate 92 and is positioned in the path of oxidizing gas flow. According to another exemplary embodiment, the CCC 98 may have approximately half the compliance or resilience of the soft CCC 60.

At a bottom end of the positive end cell assembly 30, a flat cathode 100 (e.g., standard or conventional cathode) may be disposed immediately below the CCC 98, sandwiched between the lower lip portions of the second bipolar plate 92. According to an exemplary embodiment, the cathode 100 may be formed substantially from nickel and provides an interface between the positive end cell 30 and the first regular fuel cell 2 in the molten carbonate fuel cell stack 14.

Figure 5A:
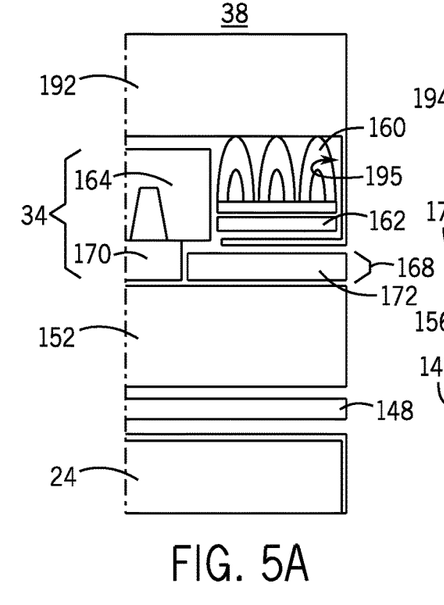
FIG. 5A is a cross-sectional view of an end cell assembly at the negative end of a fuel cell stack taken along line 5A-5A of FIG. 3.
Figure 5B:
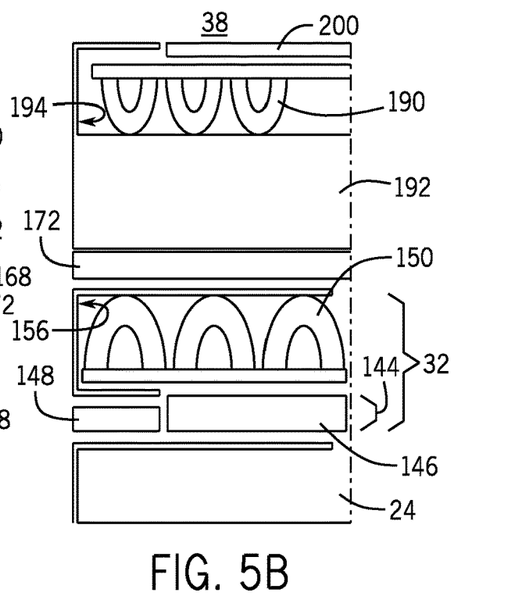
FIG. 5B is a cross-sectional view of the end cell assembly of FIG. 5A, taken along line 5B-5B of FIG. 3, substantially perpendicular to FIG. 5A.

The structure of the negative end cell assembly 38 may be substantially similar to that of the positive end cell assembly 30 described above, but includes only one inactive anode part 32, as will be described in further detail below with respect to the lower portion of FIG. 3 and FIGS. 5A and 5B.

In the negative end cell assembly 38, as generally shown in FIG. 2B, an inactive anode part 32 borders the end plate 24 at the negative end 22, separating the end plate 24 from a ribbed electrode reservoir (i.e., sink) 34. With reference to the detailed view of the negative end cell assembly 38 shown in the lower portion of FIG. 3 and in FIGS. 5A and 5B, the inactive anode part 32 further includes a foam anode layer 144 and an ACC 150, but may otherwise be substantially the same as the inactive anode part 32 in the positive end cell assembly 30. In the negative end cell assembly 38, however, the foam anode layer 144 may include a nickel foam anode 146 and matrix strips 148 (e.g., gaskets) located immediately adjacent to the negative end plate 24. In this configuration, the foam anode layer 144 is disposed below the ACC 150, rather than above the ACC 50 as in the positive end cell assembly 30. As will be discussed, elements having the same term and similar reference numerals may be substantially the same.

The ACC 150 is contained in the pocket 156 of a single-layer bipolar plate 152 having only a lower lip that folds under the ACC 150 along its edges substantially parallel to the direction of the flow of reducing gas. The lower lip meets edges of the nickel foam anode 146 in the foam anode layer 144 such that the foam anode 146 is disposed directly below the ACC 150, between the lower lip portions of the single-layer bipolar plate 152, as shown. In this configuration, the ACC 150 is in direct contact with, and collects current from, the nickel foam anode 146. Matrix strips 148 in the foam anode layer 144 may be sandwiched between the lower lip portions of the bipolar plate 152 and the end plate 24 at the negative end 22. Strips made of conductive metal (e.g., silver) may be provided between matrix strips 148 and the end plate 24 at the negative end 22, as shown in FIGS. 5A and 5B, to provide corrosion protection to the end plate surfaces. The inactive anode part 32 in the negative end cell assembly 38 thereby provides an electrically conductive separating interface between the end plate 24 and a ribbed electrode reservoir 34, described further below.

The top portion of the single-layer bipolar plate 152 separates the ACC 150 of the inactive anode part 32 from a flat cathode layer 168 in the ribbed electrode reservoir 34 directly above it. Like the ribbed electrode reservoir 34 in the positive end cell assembly 30, the reservoir 34 in the negative end cell assembly 38 includes a flat cathode 170 and a ribbed cathode 164. The flat cathode layer 168 includes a flat cathode 170 (e.g., formed from nickel) and two matrix strips 172 disposed on each side of the flat cathode 170, sandwiched between the top portion of the single-layer bipolar plate 152 in the inactive anode part 32, described above, and the lower lip portions of an "S"-shaped bipolar plate 192. The matrix strips 172 in the flat cathode layer 168 are disposed substantially parallel to the direction of oxidizing gas flow, such that the matrix strips may seal oxygen gas from the reducing gas.

According to an exemplary embodiment, the "S"-shaped bipolar plate 192 in the negative end cell assembly 38 has substantially the same structure as bipolar plates 52, 92 in the positive end cell assembly 30, in that it defines top and bottom pockets 194, 195 disposed along the flow of reducing gas and along the flow of oxidizing gas, respectively. The top and bottom portions of the bipolar plate 192 each form a lip folding over a portion of the top and bottom pockets 194, 195, respectively, along both edges thereof. The lower lip of the "S"-shaped bipolar plate 192 folds under the bottom pocket 195 along its edge, substantially parallel to the direction of the flow of oxidizing gas. Like the bottom pocket 56 of the bipolar plate 52 in the electrode reservoir 34 of the positive end cell assembly 30, the bottom pocket 195 of the bipolar plate 192 in the electrode reservoir 34 of the negative end cell assembly 38 may include both a compliant, soft CCC 160 and a ribbed cathode 164. In this configuration, the CCC 160 is disposed in the bottom pocket 195 between the lower lip and the center portion of the bipolar plate 192 along the length of the lower lip, parallel to the flow of oxidizing gas. A ribbed cathode 164 is also disposed in the bottom pocket 195 of the bipolar plate 192. As in the electrode reservoir 34 of the positive end cell assembly 30, the ribbed structure of the cathode 164 provides channels for oxidizing gas to flow through and uniformly oxidize the nickel material from which the ribbed cathode 164 is primarily formed. The lower lip of the bipolar plate 192, which folds under the soft, compliant strips of CCC 160 substantially parallel to the direction of the flow of oxidizing gas, matches up with the edges of the ribbed cathode 164, such that the ribbed cathode 164 is disposed between the strips of CCC 160 and the lower lip portions of the bipolar plate 192. In all other respects, the structure of the ribbed electrode reservoir 34 in the negative end cell assembly 38 may be substantially the same as that of the ribbed electrode reservoir 34 in the positive end cell assembly 30.

The combination of the soft, compliant and resilient CCC 160 in the bottom pocket 195 of the bipolar plate 192 and the electrically conductive separating interface provided by the inactive anode part 32 may provide the same or similar advantages in the negative end cell assembly 38 as it does in the positive end cell assembly 30. For example, the combination may limit contact loss and the corresponding substantially irreversible increase in electrical resistance within the negative end cell assembly 38.

In the negative end cell assembly 38, the combination of the ribbed and flat cathodes 164, 170 provides an electrolyte reservoir 34 at the lower end of the fuel cell stack 14. As discussed above with respect to various problems inherent in fuel cell stack 14 operation, molten electrolyte 8 material tends to migrate toward the negative end 22 of the stack 14 during operation. According to an exemplary embodiment, the ribbed and flat cathodes 164, 170 may be formed from substantially the same material as the electrolyte reservoir 34 in the positive end cell assembly 30, having up to 70% porosity. A higher porosity cathode may be used, but may result in greater thickness reduction during operation. However, in the negative end cell assembly 38, the ribbed and flat cathodes 164, 170 function as a sink or sponge for electrolyte 8 material. The reservoir 34 absorbs molten electrolyte 8 and holds onto it, thereby preventing the negative end 22 of the stack 14 from flooding and/or corroding. In combination with the ribbed electrode reservoir 34 in the positive end cell assembly 30, the ribbed electrode reservoir 34 in the negative end cell assembly 38 may significantly mitigate electrolyte 8 migration and loss during operation of the molten electrolyte fuel cell stack 14. Another advantage of the various end cell assemblies, in both the positive and negative end cell assemblies 30, 38, is that the combination of soft, compliant and resilient CCC 60, 160 with ribbed and flat cathodes provides a softer, more compliant and resilient wet seal in the ribbed electrode reservoir or sink for maintaining electrical contact in the active area of the end cell.

According to an exemplary embodiment, an ACC 190 may be disposed above the electrode reservoir 34 in the negative end cell assembly 38, within the top pocket 194 of the three-dimensional "S"-shaped bipolar plate 192. The top lip of the bipolar plate 192 folds over the ACC 190 along its edges substantially parallel to the direction of the flow of reducing gas and matches up with the edges of an anode 200 (e.g., standard or conventional anode) such that the anode 200 is disposed directly above the ACC 190, between the top edges of the bipolar plate 192, as shown. Thus, the ACC 190 may be in direct contact with, and collect current from, the anode 200. According to an exemplary embodiment, the anode 200 may be formed from a nickel-based alloy and provide the interface between the negative end cell assembly 38 and the last regular fuel cell 2 in the MCFC stack 14.

Figure 6A:
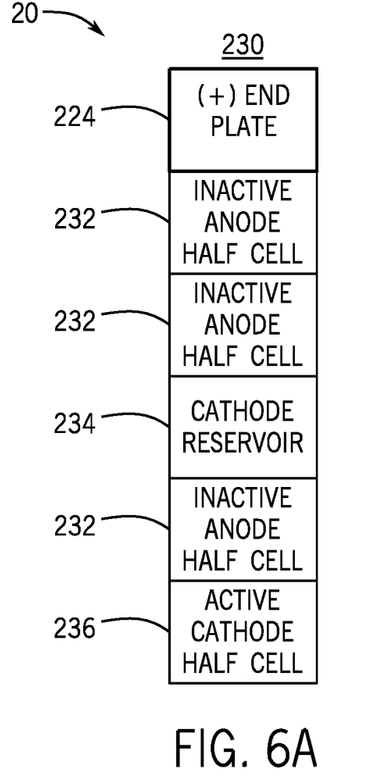
FIG. 6A is a block diagram of an end cell assembly at a positive end of a MCFC stack, according to an exemplary embodiment.
Figure 6B:
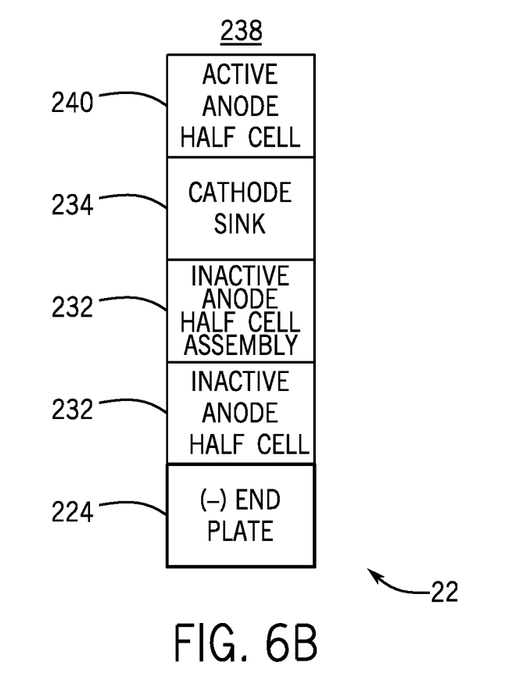
FIG. 6B is a block diagram of an end cell assembly at a negative end of a MCFC stack, according to an exemplary embodiment.

FIGS. 6A and 6B are similar to FIGS. 2A and 2B, such that similar reference numerals denote the same or similar components. Referring now to FIG. 6A, a positive end cell assembly 230 (e.g., an end cell at a positive end 20 of a fuel cell stack 14) is shown according to an exemplary embodiment. At least two (e.g., first and second) inactive anode parts 232 (e.g., half-cells) are disposed adjacent to an end plate 224 at the positive end 20 of the stack 14. A cathode reservoir 234 (i.e., sink) is disposed adjacent to the at least two inactive anode parts 232 and a third inactive anode part 232 is disposed on an opposing side of the reservoir 234. An active cathode part 236 (e.g., half-cell) is disposed on an opposing side of the third inactive anode part 232 from the cathode reservoir 234, such that the third inactive anode part 232 is disposed between the reservoir 234 and the active cathode part 236.

Referring now to FIG. 6B, a negative end cell assembly 238 (e.g., an end cell at a negative end 22 of a fuel cell stack 14) is shown according to an exemplary embodiment. At least two (e.g., first and second) inactive anode parts 232 are disposed adjacent to an end plate 224 at the negative end 22 of the stack 14. A cathode reservoir 234 (i.e., sink, ribbed electrode sink) is disposed adjacent to the at least two inactive anode parts 232 on an opposing side of the at least two inactive anode parts 232 from the end plate 224. An active anode part 240 (e.g., half-cell) is disposed on an opposing side of the reservoir 234 from the at least two inactive anode parts 232, such that the reservoir 234 is disposed between the at least two inactive anode parts 232 and the active anode part 240.

In contrast to FIG. 2A, the positive end cell assembly 230 in FIG. 6A includes additional inactive anode parts 232. Similarly, in contrast to FIG. 2B, the negative end cell assembly 238 in FIG. 6B includes additional inactive anode parts 232. In these configuration, the presence of additional inactive anode parts 232 blocks, at least in part, fuel bypass through the inactive anode parts 232 collectively, and therefore through the end cell assemblies 230, 238. By reducing the fuel bypass in the end cell assemblies 230, 238, which may otherwise be characterized as a fuel loss, the amount of fuel available for use in the electrochemical reaction increases in the rest of the fuel cell stack 14.

While FIGS. 6A and 6B show the at least two inactive anode parts 232 including only two inactive anode parts 232, according to other exemplary embodiments, more inactive anode parts 232 may be included. As the number of inactive anode parts 232 is increased (e.g., inserting more layers of inactive anode parts 232), the contact between the inactive anode parts 232 and the adjacent cathode reservoir 234 is improved, while under compression. However, increasing the number of inactive anode parts 232 may also increase the resistance in the fuel cell stack 14, thereby limiting the number of additional inactive anode parts 232 that may be added without compromising the capacity of the stack 14.

Figure 7A:
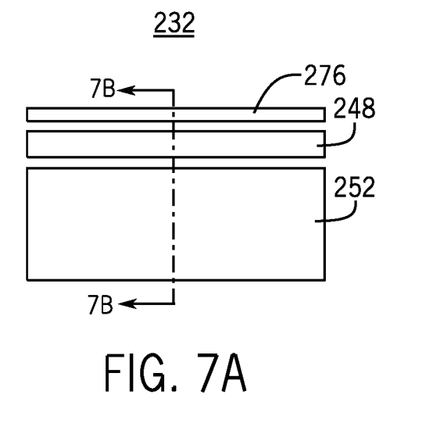
FIG. 7A is a cross-sectional view of an inactive anode part, according to an exemplary embodiment.
Figure 7B:
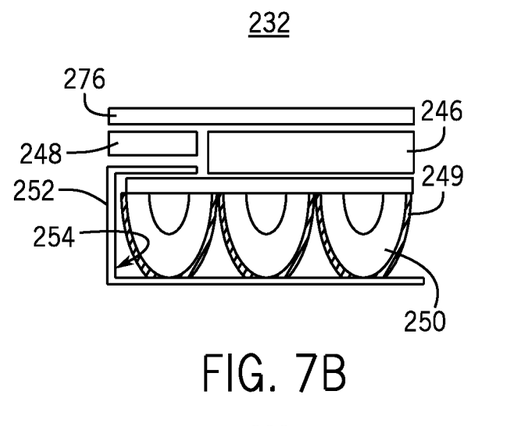
FIG. 7B is a cross-sectional view of the inactive anode part of FIG. 7A, taken along line 7B-7B of FIG. 7A and substantially perpendicular to FIG. 7A.
Figure 7C:
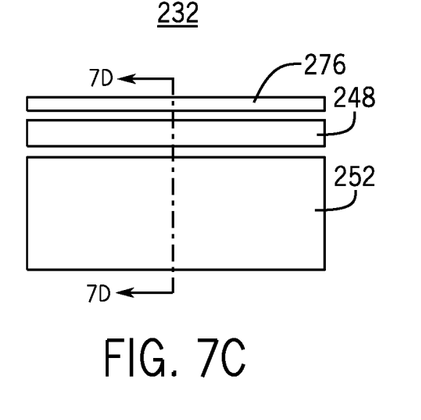
FIG. 7C is a cross-sectional view of an inactive anode part, according to an exemplary embodiment.
Figure 7D:
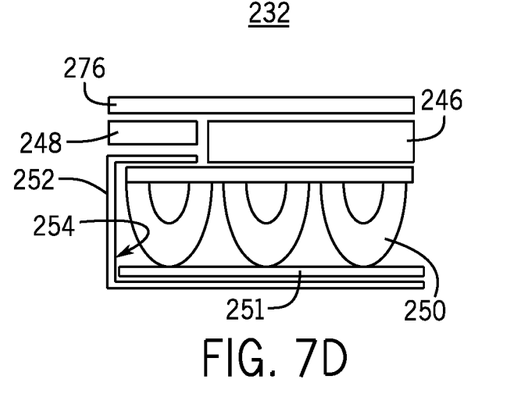
FIG. 7D is a cross-sectional view of the inactive anode part of FIG. 7C, taken along line 7D-7D of FIG. 7C and substantially perpendicular to FIG. 7C.
Figure 7E:
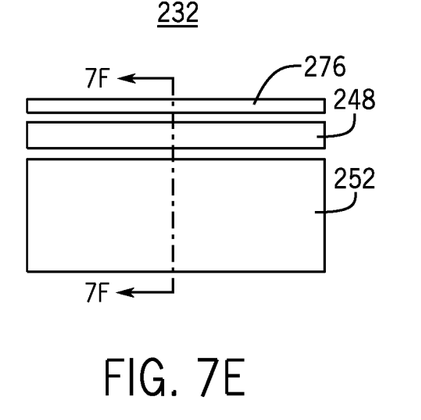
FIG. 7E is a cross-sectional view of an inactive anode part, according to an exemplary embodiment.
Figure 7F:
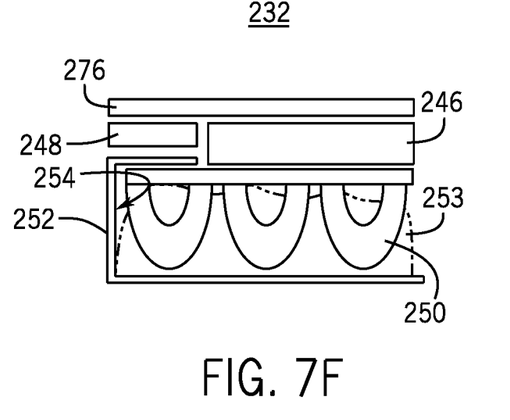
FIG. 7F is a cross-sectional view of the inactive anode part of FIG. 7E, taken along line 7F-7F of FIG. 7E and substantially perpendicular to FIG. 7E.

As shown in FIGS. 7A-7F generally, nickel coatings are shown applied to inactive anode parts 232, according to various exemplary embodiments. In these configurations shown in FIGS. 7A-7F or other configurations incorporating a nickel component, the presence of nickel may improve the stability of the thermal profile in the inactive anode part 232. For example, the nickel coating or component may distribute heat more effectively, thereby reducing deformation within the end cell due to an uneven thermal profile. Referring to FIGS. 7A and 7B, a nickel coating 249 (e.g., cladding) may be applied to the ACC 250, such that the ACC 250 contacts a bipolar plate 252 through the nickel coating 249. In this configuration, the nickel coating may best reduce thermal variations across the peaks and valleys of the ACC 250. Similarly, as shown in FIGS. 7C and 7D, a nickel foil layer 251 may be disposed between the ACC 250 and the bipolar plate 252. This nickel foil layer 251 may be separable or bonded to at least one of the ACC 250 and the bipolar plate 252. In this configuration, the nickel coating may best reduce thermal variations across the bipolar plate 252 and may be configured to engage the bipolar plate 252 at substantially the entire cross-sectional area thereof. In the aforementioned configurations or other configurations, the nickel coating may be bonded (e.g., sintered) to at least one of the ACC 250 or the bipolar plate 252. Referring now to FIGS. 7E and 7F, a nickel foam layer 253 may be disposed between the ACC 250 and the bipolar plate 252. For example, the nickel foam layer 253 may be configured to deform around the ACC 250, such that as the ACC 250 and the bipolar plate 252 are compressed toward each other, the nickel foam layer 253 deforms around the ACC 250. The nickel foam layer 253 may engage the bipolar plate 252 at substantially the entire cross-sectional area. The nickel foam layer 253 may deform around the ACC 250, with portions filling the void (e.g., valley) defined between adjacent peaks of the ACC 250. According to other exemplary embodiments, the inactive anode part 232 may include additional sealing means. For example, the inactive anode part 232 may include sealing caulk or substantially impermeable rails at edges proximate a fuel inlet and/or a fuel outlet. In this configuration, fuel bypass (e.g., fuel passing around, rather than through the fuel cell 2) may be reduced or eliminated through each of the inactive anode parts 232.

For each of the configurations shown in FIGS. 7A-7F, a metal separator sheet 276 and opposing matrix strips 248 having a nickel foam anode 246 disposed therebetween may be disposed on top of the ACC 250, as shown in FIGS. 4A and 4B. In this configuration, the ACC 250 and nickel layer 249, 251, 253 is disposed in a pocket 254 defined by the "S"-shaped bipolar plate 252.

Figure 8A:
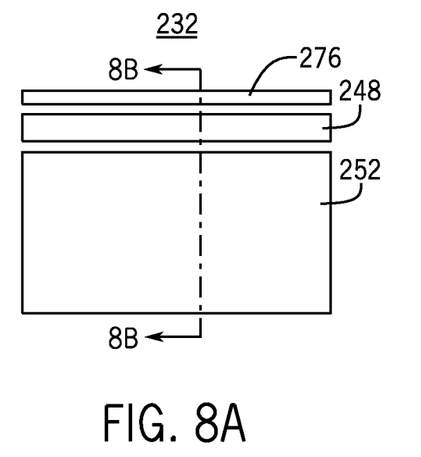
FIG. 8A is a cross-sectional view of an inactive anode part, according to an exemplary embodiment.
Figure 8B:
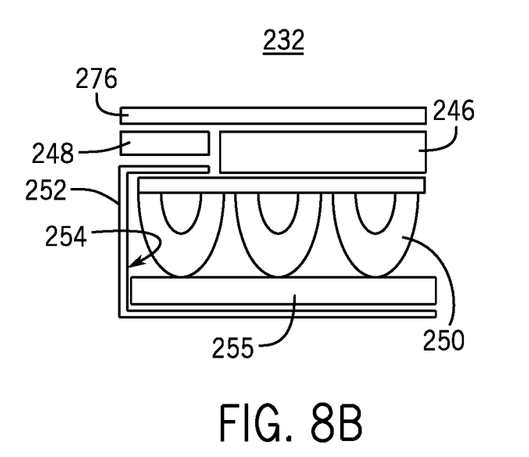
FIG. 8B is a cross-sectional view of the inactive anode part of FIG. 8A, taken along line 8B-8B of FIG. 8A and substantially perpendicular to FIG. 8A.

As shown in FIGS. 8A-8D generally, the inactive anode part 232 may include a copper layer 255 (e.g., plate), according to various exemplary embodiments. A copper layer 255 may be configured to improve the flow of current through at least one of the inactive anode part 232 or the end cell assembly 230, 238, generally. As with the nickel coating discussed above, the copper layer 255 may also improve the thermal distribution within the inactive anode part 232. The structure of an end plate 224 may result in biasing the flow of current in an end cell assembly 230, 238. Given the highly-conductive properties of copper, the presence of a copper layer 255 in the inactive anode part 232 (e.g., disposed between the ACC 250 and the bipolar plate 252) may increase the flow of current therethrough. Referring to FIGS. 8A and 8B, the inactive anode part 232 includes a copper plate 255 disposed between the ACC 250 and the bipolar plate 252. In this configuration, the copper plate 255 may cover substantially the entire cross-sectional area of at least one of the ACC 250 and the bipolar plate 252. Specifically, with respect to FIGS. 8A and 8B, the ACC 250 and copper plate 255 is disposed in a pocket 254 defined by the "S"-shaped bipolar plate 252.

Figure 8C:
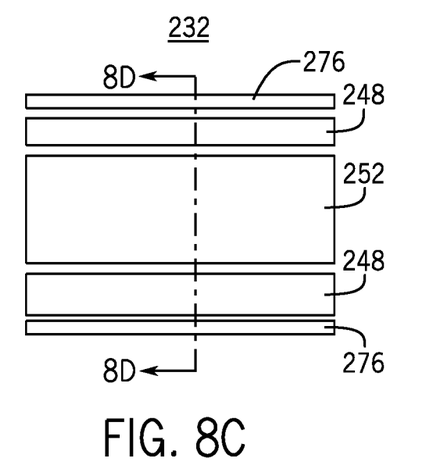
FIG. 8C is a cross-sectional view of an inactive anode part, according to an exemplary embodiment.
Figure 8D:
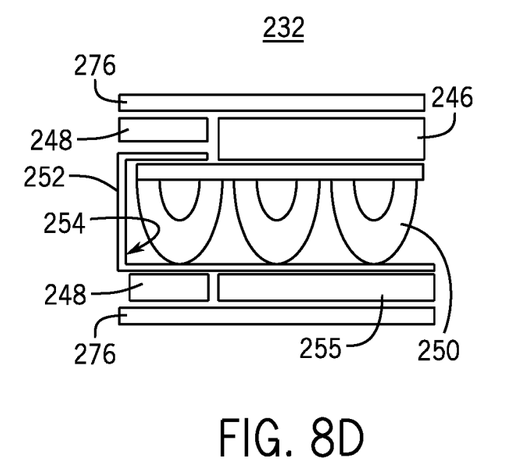
FIG. 8D is a cross-sectional view of the inactive anode part of FIG. 8C, taken along line 8D-8D of FIG. 8C and substantially perpendicular to FIG. 8C.

Referring to FIGS. 8C and 8D, the copper plate 255 may be disposed outside of and directly on the inactive anode part 232. For example, the copper plate 255 may be disposed between two opposing matrix strips 248 (e.g., gaskets), between the bipolar plate 252 and a second separator sheet 276. The matrix strips 248 may be disposed adjacent to the copper plate 255 and between the ACC 250 and a metal separator sheet 276. The matrix strips 248 may provide additional sealing between at least two of the ACC 250, the bipolar plate 252, and an outer surface (e.g., edge) of the end cell assembly 230, 238. In this configuration, the copper plate 255 covers less than the entire cross-sectional area of each of the ACC 250 and the bipolar plate 252. According to other exemplary embodiments, the copper plate 255 may be disposed in other fuel cells 2 between the end cells to improve the flow of current and/or the thermal distribution in those fuel cells 2. In addition to or in place of the matrix strips 248, according to other exemplary embodiments, the inactive anode part 232 may be sealed in other ways. For example, the inactive anode part 232 may include sealing caulk or substantially impermeable rails at edges proximate a fuel inlet and/or a fuel outlet. In this configuration, fuel bypass is reduced or eliminated through each of the inactive anode parts 232. While FIGS. 8A-8D show the copper plate 255 disposed proximate an ACC 250, according to other exemplary embodiments, the copper plate 255 may be disposed proximate a CCC 260 (not shown).

For each of the configurations shown in FIGS. 8A-8D, a metal separator sheet 276 and opposing matrix strips 248 having a nickel foam anode 246 disposed therebetween may be disposed on top of the ACC 250, as shown in FIGS. 4A and 4B.

Figure 9A:
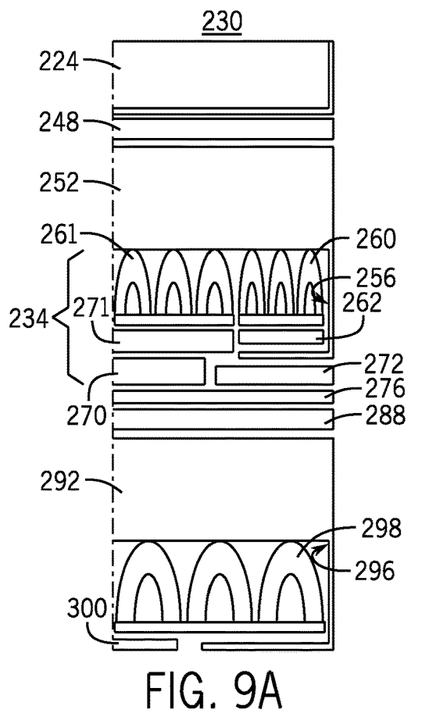
FIG. 9A is a cross-sectional view of an end cell assembly at the positive end of a fuel cell stack, according to an exemplary embodiment.
Figure 9B:
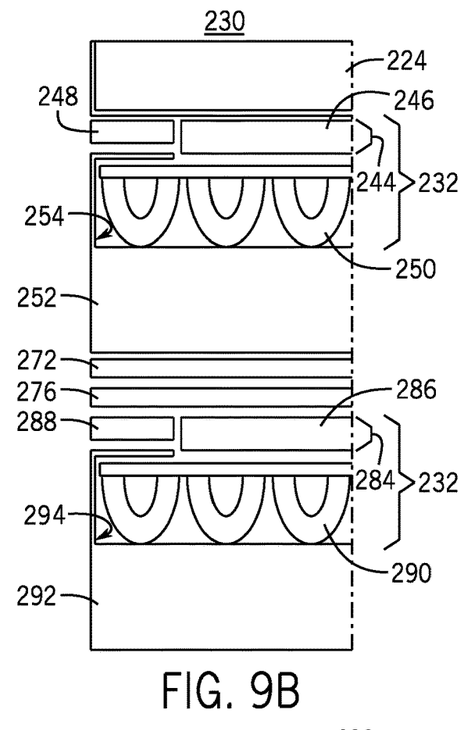
FIG. 9B is a cross-sectional view of the end cell assembly of FIG. 9A, substantially perpendicular to FIG. 9A.

As shown in FIGS. 9A-9D generally, an end cell assembly 230, 238 may include an electrode reservoir 234 according to an exemplary embodiment. Referring now to FIGS. 9A and 9B, a positive end cell assembly 230 is shown according to an exemplary embodiment. The positive end cell assembly 230 may be similar to the positive end cell assembly 30 shown in FIGS. 4A and 4B, such that similar reference numerals denote the same or similar components. However, in contrast to FIGS. 4A and 4B, the electrode reservoir 234 of the positive end cell assembly 230 may include a second flat cathode 271 and a second CCC 261 instead of or in addition to the ribbed cathode 64. The second flat cathode 271 may be disposed on top of the cathode 270 and the second CCC 261 may be disposed on top of the second cathode 271 and adjacent to the CCC 260. In this configuration, the second flat cathode 271 is disposed between the cathode 270 and the second CCC 261. According to an exemplary embodiment, the second cathode 271 may be disposed adjacent to the metal shim 262.

Similarly to the positive end cell assembly 30, the positive end cell assembly 230 shown in FIGS. 9A and 9B includes the metal separator sheet 276, disposed between the electrode reservoir 234 and a foam anode layer 284, substantially the same as the foam anode layers 84 and 44 discussed above. For example, FIGS. 9A and 9B show a second inactive anode part 232 having a foam layer 284 substantially similar to the foam anode layer 84, having a foam anode 286 sandwiched between opposing matrix strips 288 (i.e., gaskets), and an ACC 290 in a top pocket 294 of a second three-dimensional "S"-shaped bipolar plate 292. Matrix strips 272 are disposed on opposing sides of the cathode 270. Below the second inactive anode part 232, in a bottom pocket 296 of the second "S"-shaped bipolar plate 292, is disposed a CCC 298. At a bottom end of the positive end cell assembly 230, a flat cathode 300 (e.g., standard or conventional cathode) may be disposed immediately below the CCC 298.

Figure 9C:
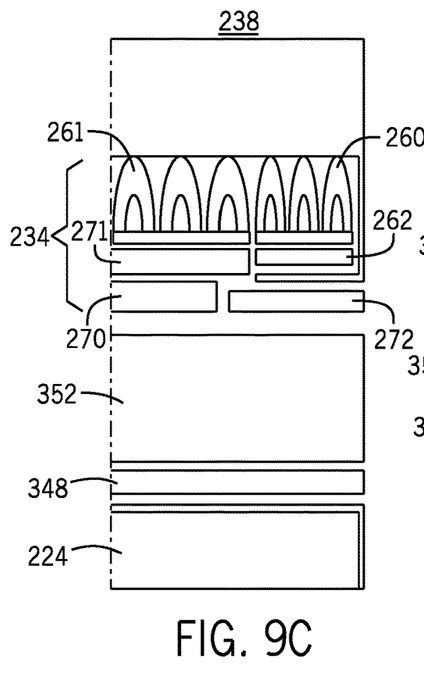
FIG. 9C is a cross-sectional view of an end cell assembly at the negative end of a fuel cell stack, according to an exemplary embodiment.

As shown in FIG. 9C, the positive end cell assembly 230 includes both first and second CCCs 260, 261, although according to other exemplary embodiments, more or fewer CCCs 260, 261 may be included. For example, the positive end cell assembly 230 may include one CCC 260 that covers substantially the entire cross-sectional area of the negative end cell assembly 238. According to another exemplary embodiment, one or both of the first and second CCCs 260, 261 may be substantially soft (i.e., compliant), such that the first and second CCCs 260, 261 may be compressed to form a wet seal with the surrounding walls of the stack 14 or other components within the positive end cell assembly 230.

Figure 9D:
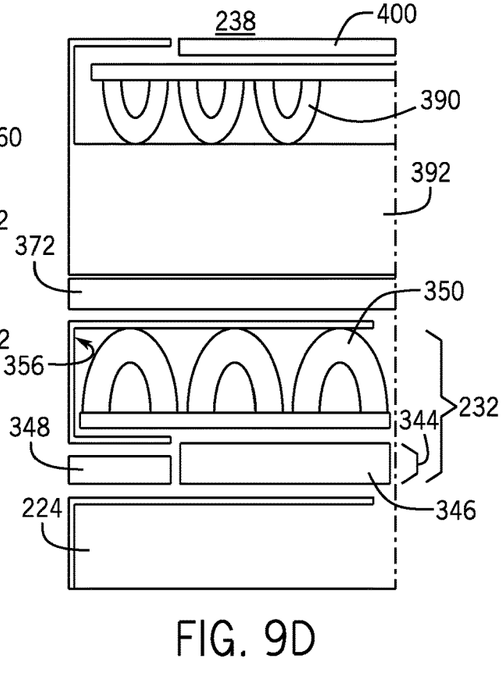
FIG. 9D is a cross-sectional view of the end cell assembly of FIG. 9C, substantially perpendicular to FIG. 9C.

Referring now to FIGS. 9C and 9D, a negative end cell assembly 238 is shown according to an exemplary embodiment. The negative end cell assembly 238 may be similar to the negative end cell assembly 38 shown in FIGS. 5A and 5B, such that similar reference numerals denote the same or similar components. However, similarly to FIGS. 9A and 9B and in contrast to FIGS. 5A and 5B, the electrode reservoir 234 of the negative end cell assembly 238 may include a second flat cathode 271 and a second CCC 261 instead of or in addition to the ribbed cathode 64. The second flat cathode 271 may be disposed on top of the cathode 270 and the second CCC 261 may be disposed on top of the second cathode 271 and adjacent to the CCC 260. In this configuration, the second flat cathode 271 is disposed between the cathode 270 and the second CCC 261. According to an exemplary embodiment, the second cathode 271 may be disposed adjacent to the metal shim 262. As shown in FIG. 9C, the negative end cell assembly 238 includes both first and second CCCs 260, 261, although according to other exemplary embodiments, more or fewer CCCs 260, 261 may be included. For example, the negative end cell assembly 238 may include one CCC 260 that covers substantially the entire cross-sectional area of the negative end cell assembly 238. According to another exemplary embodiment, one or both of the first and second CCCs 260, 261 may be substantially soft (i.e., compliant), such that the first and second CCCs 260, 261 may be compressed to form a wet seal with the surrounding walls of the stack 14 or other components within the negative end cell assembly 238.

Similarly to the negative end cell assembly 38, the positive end cell assembly 238 shown in FIGS. 9C and 9D includes a bipolar plate 352, substantially similar to the bipolar plate 152. A foam anode layer 344, substantially similar to the foam anode layer 144 is disposed between the bipolar plate 352 and the negative end plate 224 and includes a nickel foam anode 346 and opposing matrix strips 348 (e.g., gaskets) adjacent to the nickel foam anode 346 on opposing sides thereof. The matrix strips 348 in the foam anode layer 344 may be sandwiched between the lower lip portions of the bipolar plate 352 and the end plate 224.

With respect to FIGS. 9A-9D, the combination of the flat second cathode 271 and the second CCC 261 may still function as an electrode reservoir 234, but may result in an increase in migration of the electrolyte 8 relative to a ribbed cathode 64. However, the flat second cathode 271 and the second CCC 261 define an overall height that is less than the ribbed cathode 64, such that replacing the ribbed cathode 64 with the flat second cathode 271 and the second CCC 261 reduces the overall height and volume of the end cell assemblies 230, 238, thereby reducing the overall packaging space of a fuel cell stack 14. Furthermore, the change may reduce the cost and complexity of manufacturing the end cell assemblies 230, 238 by limiting the number of parts and shapes to be accommodated within the stack 14 and needed to be stocked for manufacturing. For example, the flat second cathode 271 may be substantially the same as the first cathode 270 and the second CCC 261 may be substantially the same as the first CCC 260. The electrode reservoir 234 includes a foam anode layer 244. A center portion of the bipolar plate 252 separates the ACC 250 from the structure contained within a bottom pocket 256 of the bipolar plate. The inactive anode part 232 further includes an ACC 350. The ACC 350 is contained in a pocket 356 of the single-layer bipolar plate 352. Matrix strips 372 are disposed on opposing sides of the cathode 270. According to an exemplary embodiment, an ACC 390 may be disposed above the electrode reservoir 234 in the negative end cell assembly 238, within the top pocket of a three-dimensional "S"-shaped bipolar plate 392. The top lip of the bipolar plate 392 folds over the ACC 390 along its edges substantially parallel to the direction of the flow of reducing gas and matches up with the edges of an anode 400.

Figure 10A:
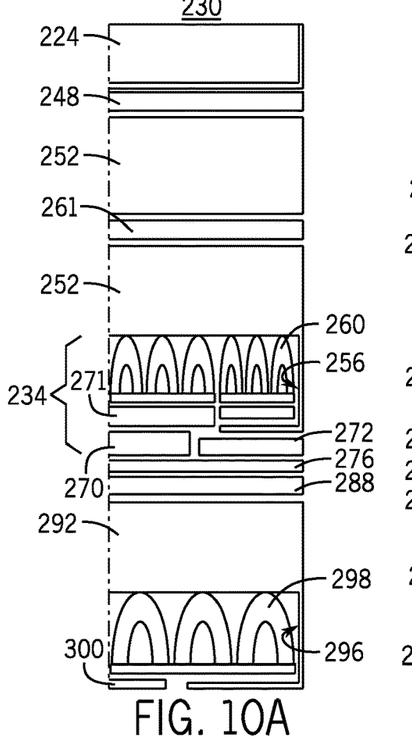
FIG. 10A is a cross-sectional view of an end cell assembly at the positive end of a fuel cell stack, according to an exemplary embodiment.
Figure 10B:
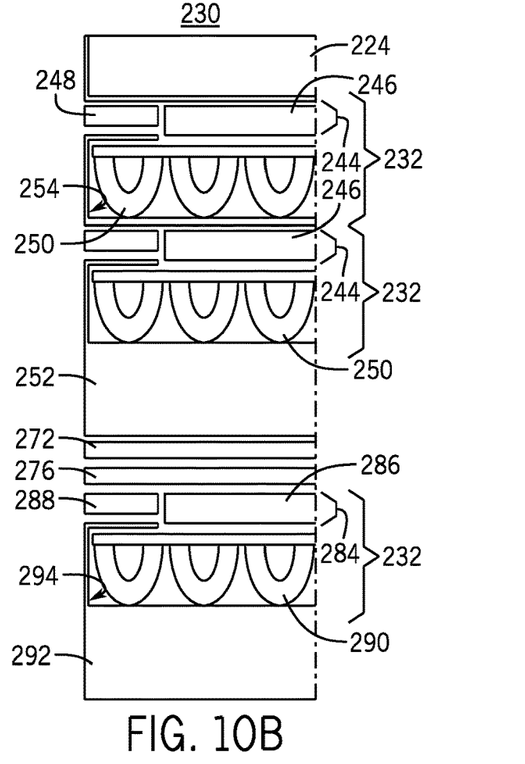
FIG. 10B is a cross-sectional view of the end cell assembly of FIG. 10A, substantially perpendicular to FIG. 10A.
Figure 10C:
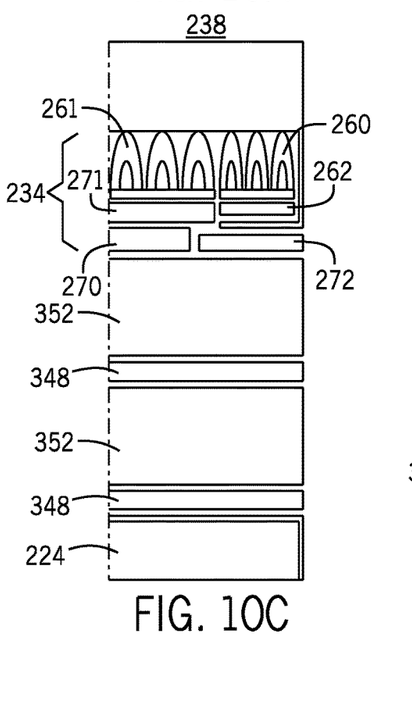
FIG. 10C is a cross-sectional view of an end cell assembly at the negative end of a fuel cell stack, according to an exemplary embodiment.
Figure 10D:
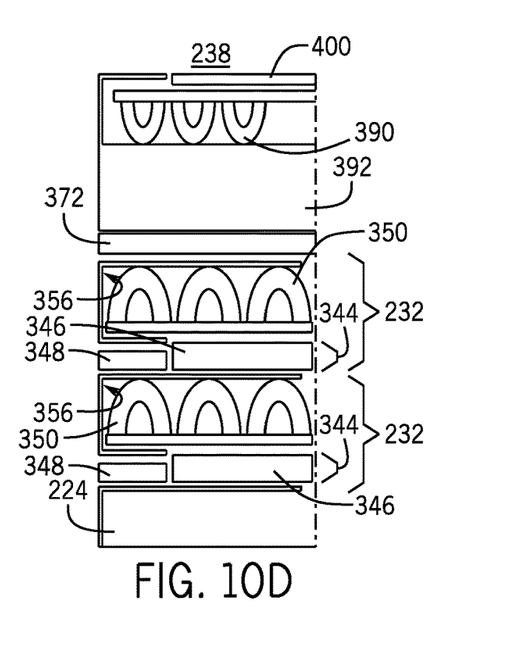
FIG. 10D is a cross-sectional view of the end cell assembly of FIG. 10C, substantially perpendicular to FIG. 10C.

To the extent that the migration of the electrolyte 8 increases by including a flat second cathode 271 and a second CCC 261, the end cell assemblies 230, 238 may be modified according to other exemplary embodiments described in this application. For example, as shown in FIGS. 10A and 10B, the positive end cell assembly 230 may include at least one of an additional inactive anode part 232 and/or a copper layer 255 (not shown). Matrix strips 272 are disposed on opposing sides of the cathode 270. The electrode reservoir 234 includes the foam anode layer 244. A center portion of the bipolar plate 252 separates the ACC 250 from the structure contained within the bottom pocket 256 of the bipolar plate. Below the second inactive anode part 232, in the bottom pocket 296 of the second "S"-shaped bipolar plate 292, is disposed the CCC 298. At a bottom end of the positive end cell assembly 230, the flat cathode 300 (e.g., standard or conventional cathode) may be disposed immediately below the CCC 298. Similarly, as shown in FIGS. 10C and 10D, the negative end cell assembly 238 may include at least one of an additional inactive anode part 232 and/or a copper layer 255 (not shown). According to other exemplary embodiments, the migration of the electrolyte 8 may be reduced in other ways. The inactive anode part 232 further includes the ACC 350. The ACC 350 is contained in the pocket 356 of the single-layer bipolar plate 352. Matrix strips 372 are disposed on opposing sides of the cathode 270. According to an exemplary embodiment, the ACC 390 may be disposed above the electrode reservoir 234 in the negative end cell assembly 238, within the top pocket of the three-dimensional "S"-shaped bipolar plate 392. The top lip of the bipolar plate 392 folds over the ACC 390 along its edges substantially parallel to the direction of the flow of reducing gas and matches up with the edges of an anode 400.

It should be noted that in fuel cell stacks 14 in an SOFC, the electrolyte is solid and therefore generally does not suffer from electrolyte migration. In the SOFC configuration, the cathode reservoir 234 does not serve as an electrolyte sink. The stack 14 may be formed with or without the cathode reservoir 234. However, in the SOFC configuration, the stack 14 may still include at least one of the copper layer 255, the inactive anode part 232, the nickel coating 249, the nickel foil layer 251, and/or the nickel foam anode 246 as described above, as each of these structures improves contact in the end cell assemblies 230, 238.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An end cell assembly for a fuel cell stack, comprising:
   a positive end plate;
   a first inactive anode part located immediately adjacent to the positive end plate, the first inactive anode part comprising:
   a first anode current collector,
   a first nickel foam anode disposed directly above the first anode current collector,
   a first bipolar plate, and a first nickel foil layer disposed between the first anode current collector and the first bipolar plate;
a second inactive anode part located immediately adjacent to the first inactive anode part, the second inactive anode part comprising:
a second anode current collector,
a second nickel foam anode disposed directly above the second anode current collector,
a second bipolar plate, and
a second nickel foil layer disposed between the second anode current collector and the second bipolar plate;
a cathode reservoir disposed adjacent to the second inactive anode part;
a third inactive anode part disposed adjacent to the cathode reservoir on a side opposite the second inactive anode part, the third inactive anode part comprising:
a third anode current collector,
a third nickel foam anode disposed directly above the third anode current collector,
a third bipolar plate, and
a third nickel foil layer disposed between the third anode current collector and the third bipolar plate; and
an active cathode part disposed on a side of the third inactive anode part opposite the cathode reservoir.

2. The end cell assembly of claim 1, wherein each inactive anode part further comprises a nickel coating disposed on each anode current collector.

3. The end cell assembly of claim 2, wherein
each anode current collector contacts the respective bipolar plate through the nickel coating.

4. The end cell assembly of claim 2, wherein the nickel coating is bonded to each anode current collector.

5. The end cell assembly of claim 1, wherein each nickel foil layer is bonded to the respective bipolar plate.

6. The end cell assembly of claim 1, wherein each inactive anode part further comprises a copper plate disposed between the respective anode current collector and the respective bipolar plate.

7. The end cell assembly of claim 1, wherein each inactive anode part comprises a separator sheet disposed above the nickel foam anode.

8. The end cell assembly of claim 7, wherein: each inactive anode part further comprises a copper layer disposed on the respective bipolar plate; and the respective anode current collector is disposed on the respective bipolar plate on a side opposite the copper layer.

9. The end cell assembly of claim 8, wherein:
the separator sheet is a first separator sheet;
each inactive anode further comprises a second separator sheet disposed on the copper layer; and
the copper layer is disposed between the respective bipolar plate and the second separator sheet.

10. The end cell assembly of claim 1 wherein the cathode reservoir comprises:
a first cathode current collector;
a second cathode current collector adjacent to the first cathode current collector;
a second cathode disposed adjacent to the second cathode current collector; and
a first cathode disposed adjacent to the second cathode on a side opposite the second cathode current collector.

11. An end cell assembly for a fuel cell stack, comprising:
a negative end plate;
a first inactive anode part located immediately adjacent to the negative end plate, the first inactive anode part comprising:
a first anode current collector,
a first nickel foam anode disposed directly above the first anode current collector,
a first bipolar plate,
and a first nickel foil layer disposed between the first anode current collector and the first bipolar plate;
a second inactive anode part located immediately adjacent to the first inactive anode part, the second inactive anode part comprising:
a second anode current collector,
a second nickel foam anode disposed directly above the second anode current collector,
a second bipolar plate, and
a second nickel foil layer disposed between the second anode current collector and the second bipolar plate;
a cathode reservoir disposed adjacent to the second inactive anode part; and
an active anode part disposed adjacent to the cathode reservoir on a side opposite the second inactive anode part.

12. An end cell assembly for a fuel cell stack, comprising:
an end plate;
a first inactive anode part located immediately adjacent to the end plate, the first inactive anode part comprising:
a first anode current collector,
a first nickel foam anode disposed directly above the first anode current collector,
a first bipolar plate, and
a first nickel foam layer disposed between the first anode current collector and the first bipolar plate, the first nickel foam layer deformed around first corrugations of the first anode current collector; and
a second inactive anode part located immediately adjacent to the first inactive anode part, the second inactive anode part comprising:
a second anode current collector,
a second nickel foam anode disposed directly above the second anode current collector,
a second bipolar plate, and
a second nickel foam layer disposed between the second anode current collector and the second bipolar plate, the second nickel foam layer deformed around second corrugations of the second anode current collector.

13. The end cell assembly of claim 12, wherein each inactive anode part further comprises a nickel coating disposed on the respective anode current collector.

14. The end cell assembly of claim 12, wherein each inactive anode part further comprises a copper plate disposed between the respective anode current collector and each bipolar plate.

* * * * *